No. 822,439. PATENTED JUNE 5, 1906.
W. F. ELLIS & E. C. DAVIS.
TIRE CONSTRUCTION.
APPLICATION FILED AUG. 9, 1904.
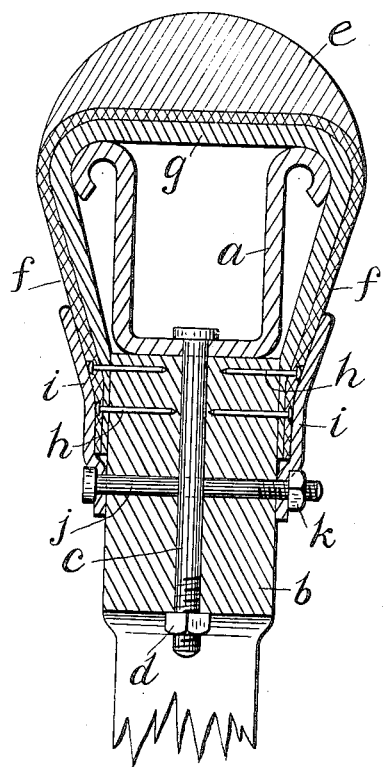
Witnesses
Inventors
William F. Ellis
Edwin C. Davis
By Allen Webster
Attorney

UNITED STATES PATENT OFFICE.

WILLIAM FREDERICK ELLIS, OF STAMFORD, CONNECTICUT, AND EDWIN CURTIS DAVIS, OF NEW BRUNSWICK, NEW JERSEY, ASSIGNORS TO THE UNIVERSAL TIRE COMPANY, OF NEW YORK, N. Y., A CORPORATION OF MAINE.

TIRE CONSTRUCTION.

No. 822,439.     Specification of Letters Patent.     Patented June 5, 1906.

Application filed August 9, 1904. Serial No. 220,077.

*To all whom it may concern:*

Be it known that we, WILLIAM FREDERICK ELLIS, a resident of Stamford, in the county of Fairfield and State of Connecticut, and EDWIN CURTIS DAVIS, a resident of New Brunswick, in the county of Middlesex and State of New Jersey, citizens of the United States of America, have invented a new and useful Tire Construction, of which the following is a specification.

Our invention relates to improvements in tires for vehicle-wheels, and particularly to certain peculiar means for attaching a special kind of tire to wooden wheels, all as hereinafter set forth; and the object of our invention is to afford a practicable and convenient construction whereby a tire made up of a rim and a yielding tread may be securely fastened to a wooden felly in such a manner that said tread can be removed and replaced at will.

A further object of our invention is to provide protection for the tread at the junction of its flaps with the felly and to inclose the fastening devices also to protect the edges of the rim-cover when used.

We attain these objects by the means illustrated in the accompanying drawing, which is a cross-section of a felly and tire embodying our improved construction.

In the main our invention consists of a rim mounted on a wooden felly, with a yielding tread mounted on said rim and having flaps which are secured to the sides of the felly by means of nails or their equivalent, guard-plates being fastened to the sides of the felly also to cover and protect the flaps at and near their points of union with the felly. With these members a cover between the rim and tread is usually provided, as will be presently explained.

An annular rim in the form of a channel-iron $a$ has its web seated on the periphery of a wooden felly $b$, and said channel-iron is held in place by means of a radial bolt $c$ and nut $d$, arranged between two of the spokes, such bolt and nut being duplicated as often as required around the circumference of the wheel. The yielding tread here employed consists of a thick peripheral part and side flaps $f f$, such tread being made up in the usual manner of rubber with a fabric lining, although some other suitable material or materials may be used, if desired. Before placing the tread $e$ on the channel-iron $a$ we generally prefer to inclose said channel-iron in a cover $g$, of leather or other suitable material. The novel features of our invention may or may not include the aforesaid cover, according to the purpose for which the tire is to be employed.

If the cover $g$ be used, it is first drawn over the channel-iron $a$. Then the tread $e$ is placed in position over said cover and the flaps $f$, with the sides of the cover, are brought inward against the sides of the felly $b$ and there secured by means of nails $h$, driven through the flaps and cover near their edges into said felly. Any number of nails $h$ on each side of the felly may be used, and screws or other equivalent devices may be substituted for the nails.

It will be observed from the foregoing that the tread is firmly secured to the felly by the nails $h$, but that it is desirable, not to say necessary, to cover the heads of the nails, protect the flaps $f$ adjacent the felly, and also protect the edges of the cover $g$, assuming that the latter be used, from the elements. To do this, we employ an annular guard-plate $i$, preferably of sheet metal, on each side of the felly. These guard-plates are held to the sides of the felly by means of a number of bolts passing transversely through said felly and said plates near their inner edges and nuts, one such bolt being shown at $j$ and a nut at $k$. The plates $i$ extend laterally from the sides of the felly above the bolt $j$ and follow the outlines of the flaps $f$ for some distance beyond the periphery of the felly, the adjacent portions of the flaps and plates being in contiguity. The plates $i$ not only protect the flaps and the cover at and near their junctions with the felly and with each other, but cover the heads of the nails $h$, so that the nails cannot work out of the felly, stiffen the structure, and improve the appearance thereof.

When the tread $e$ becomes worn out or it is desired to remove it for any other reason, the operation of removal may be easily and quickly performed by releasing the guard-plates $i$ from their nuts and bolts and withdrawing the nails $h$. A new tread or cover, or both, can be then placed in position and the parts reassembled with equal facility.

The general construction and arrangement of the other parts are not affected by the omission of the cover g.

While we prefer a construction comprising the channel-iron rim, it is clear that the novel features of our invention may be utilized in a construction which includes a different kind of rim.

Any suitable and equivalent substitute for the bolts c and j and nuts d and k may be made and other changes, particularly in relation to shape, size, and proportion, resorted to without violating the spirit of our invention.

What we claim as our invention, and desire to secure by Letters Patent, is—

1. The combination, in tire construction, with a felly, of a channeled rim mounted on said felly, a yielding tread mounted on said rim over the peripheral opening therein and having flaps extended against the sides of the felly, nails or the like inserted in the felly after passing through said flaps, and annular guard-plates fastened to the sides of the felly and covering portions of the flaps beyond the felly.

2. The combination, in tire construction, with a felly, of a channeled rim mounted on said felly, a cover extending over the peripheral opening in said rim, a yielding tread superimposed on the cover and having flaps, said flaps and the sides of said cover extending against the sides of the felly, nails or the like inserted in the felly after passing through the flaps and cover, and annular guard-plates fastened to the sides of the felly and covering the edges of the flaps and cover and portions of the sides of the flaps beyond the felly.

In testimony whereof we have signed our names to this specification in the presence of two subscribing witnesses.

WILLIAM FREDERICK ELLIS.
EDWIN CURTIS DAVIS.

Witnesses:
Jos. V. Dooley,
B. B. Sterling.